United States Patent [19]

Gajor et al.

[11] Patent Number: 5,435,632
[45] Date of Patent: Jul. 25, 1995

[54] FULL FACE FABRICATED VEHICLE WHEEL

[75] Inventors: Walter Gajor, Livonia; Dennis Jaskierny, Milford, both of Mich.

[73] Assignee: Hayes Wheels International, Inc., Romulus, Mich.

[21] Appl. No.: 126,840

[22] Filed: Sep. 24, 1993

[51] Int. Cl.6 .............................................. B60B 3/04
[52] U.S. Cl. ...................................... 301/63.1; 301/95
[58] Field of Search ...................... 301/63.1, 65, 95, 97

[56] References Cited

U.S. PATENT DOCUMENTS

| 3,874,736 | 4/1975 | Anderson et al. | 301/63.1 |
| 4,610,482 | 9/1986 | Overbeck et al. | 301/63.1 |
| 5,188,429 | 2/1993 | Heck et al. | 301/63.1 |

FOREIGN PATENT DOCUMENTS

| 505879 | 9/1992 | European Pat. Off. | |
| 1003182 | 3/1952 | France. | |
| 4018474 | 12/1991 | Germany. | |
| 67106 | 4/1984 | Japan | 301/65 |
| 5058106 | 3/1993 | Japan | 301/63.1 |
| 1403374 | 8/1975 | United Kingdom | 301/63.1 |

Primary Examiner—Russell D. Stormer
Attorney, Agent, or Firm—MacMillan, Sobanski & Todd

[57] ABSTRACT

An improved full face fabricated vehicle wheel is disclosed wherein the rim includes a uniquely shaped outboard tire bead seat which facilitates the welding of the rim to the associated wheel disc. In particular, the outboard tire bead seat includes a first section and a second section. The first section defines a first axial outer surface, and the second section defines a second axial outer surface and an axial endmost surface. The second axial outer surface of the second section is spaced radially inwardly relative to the first axial outer surface of the first section. When the axial endmost surface of the second section of the rim is positioned against an outboard tire bead seat retaining flange of the disc, a recess is formed between the second axial outer surface and the outboard tire bead seat retaining flange. The recess defines an axially extending annular groove which receives a weld to join the rim and disc together and produce the full face fabricated wheel.

3 Claims, 2 Drawing Sheets

FULL FACE FABRICATED VEHICLE WHEEL

BACKGROUND OF THE INVENTION

This invention relates to an improved full face fabricated vehicle wheel construction.

Full face fabricated wheels are becoming increasingly popular due to the enhanced styling they provide over conventional fabricated wheels. A full face fabricated wheel is distinguished from other types of fabricated wheels by having the associated wheel disc form the outboard tire bead seat retaining flange of the wheel.

One example of a full face fabricated wheel is shown in U.S. Pat. No. 4,610,482 to Overbeck et al. As shown in prior art FIG. 3, the end of an outboard bead seat 60 of the rim is provided with a radially in-turned flange 62. The in-turned flange 62 is machined to provide an axially extending surface 64, a radially inwardly sloping surface 66, and a radially extending surface 68. These surfaces 64, 66, and 68 are machined to attain the tolerances required to accurately assemble and produce the finished full face wheel. The radially inwardly sloping surface 66 cooperates with an inner surface 70A of the outboard tire bead seat retaining flange 70 of the disc to form a trench. A weld 72 is deposited in the trench to join the rim and disc together.

SUMMARY OF THE INVENTION

This invention relates to an improved full face fabricated vehicle wheel wherein the wheel rim includes a uniquely shaped outboard tire bead seat which facilitates the welding of the rim to the associated wheel disc. In particular, the full face vehicle wheel includes an annular disc and a circular rim. The disc includes a body having a centrally located wheel mounting surface and an outer annular portion. The outer annular portion defines an outboard tire bead seat retaining flange of the full face fabricated wheel. The rim defines an axis and includes an inboard tire bead seat retaining flange, an inboard tire bead seat, an axially extending well, and an outboard tire bead seat. The outboard tire bead seat of the rim includes a first section and a second section connected thereto. The first section defines a first axial outer surface, and the second section defines a second axial outer surface and an axial endmost surface. The second axial outer surface of the second section is spaced radially inwardly or offset relative to the first axial outer surface of the first section.

When the axial endmost surface of the second section of the rim is positioned against the outboard tire bead seat retaining flange of the disc, a recess is formed between the second axial outer Surface and the outboard tire bead seat retaining flange. The recess defines an axially extending annular groove which receives a weld to join the rim and disc together and produce the finish full face fabricated wheel.

The present invention provides several advantages over the above-discussed prior art. For example, it is easier to maintain the lateral runout of the rim of the present invention, especially in rims having thickened outboard tire bead seats. Also, the recess significantly thickens the "throat" of the weld thereby increasing the strength of the weld joint. In addition, the size of the blank required to form the rim of the present invention is smaller. As a result of this, the cost of the rim material and the weight of the finished rim are reduced.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
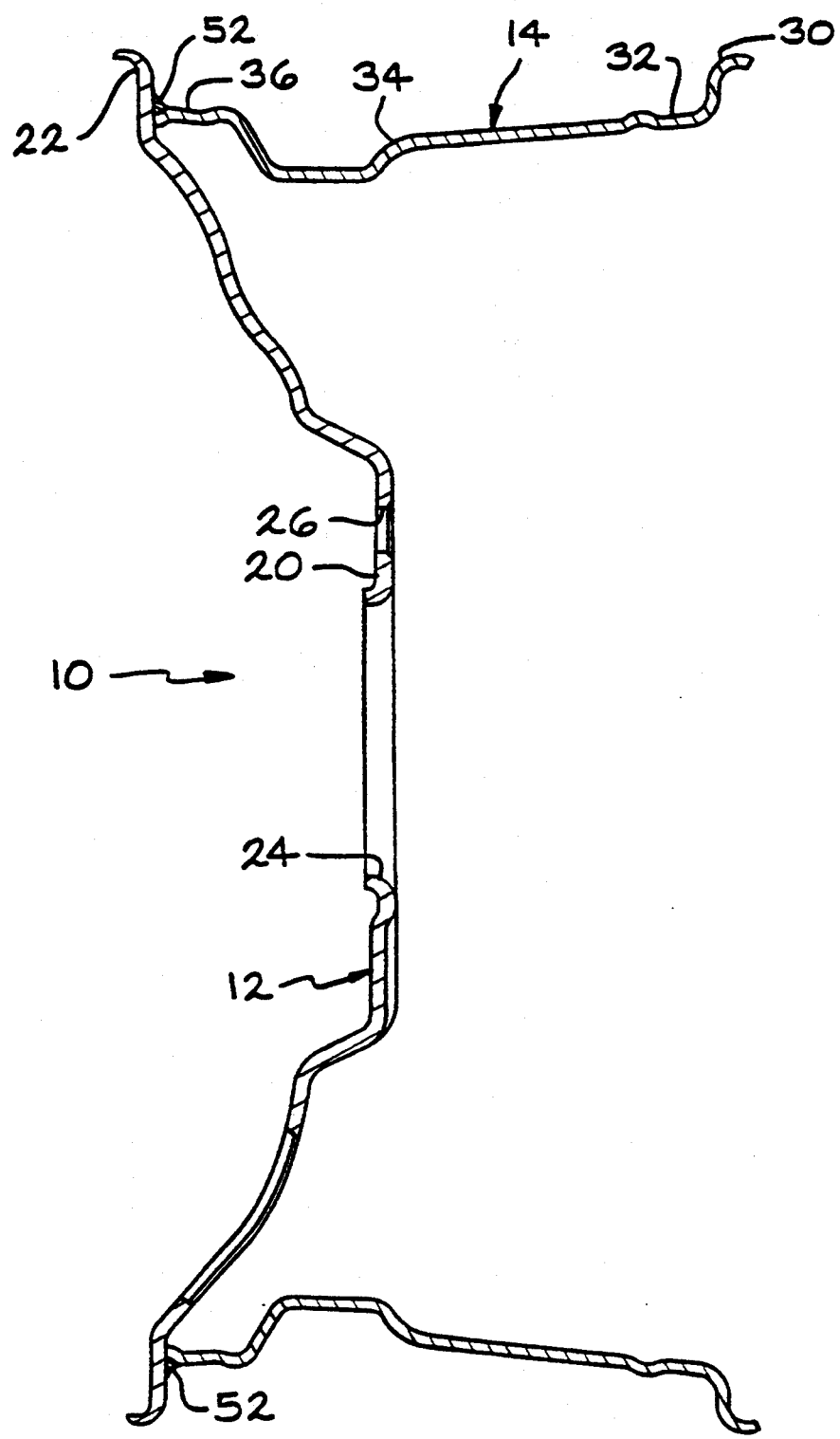
FIG. 1 is a front plan view of a fabricated full face vehicle wheel constructed in accordance with the present invention.

Referring now to the drawings, there is illustrated in FIG. 1 a full face fabricated wheel, indicated generally at 10, and constructed in accordance with the present invention. The full face fabricated wheel 10 includes a disc 12 and a rim 14 which are joined together during a welding operation.

The disc 12 is preferably constructed from steel and includes a generally centrally located wheel mounting surface 20, and an outer annular flange 22. The wheel mounting surface 20 is provided with a centrally located pilot aperture 24. A plurality of equally spaced lug mounting apertures 26 (only one shown), are spaced equidistantly from the pilot aperture 24. The lug mounting apertures 26 receive lug bolts and nuts (not shown) for securing the wheel 10 on an axle (not shown) of a vehicle. As will be discussed below, the outer annular flange 22 of the disc 12 defines an outboard tire bead seat retaining flange of the finished full face wheel 10.

The rim 14 is preferably constructed of steel and includes an inboard tire bead seat retaining flange 30, an inboard tire bead seat 32, a generally axially extending well 34, and an outboard tire bead seat 36. Also, the rim 14 is preferably formed by roll forming, although other processes, such as stamping, flow spinning, or combinations thereof can be used.

Figure 2:
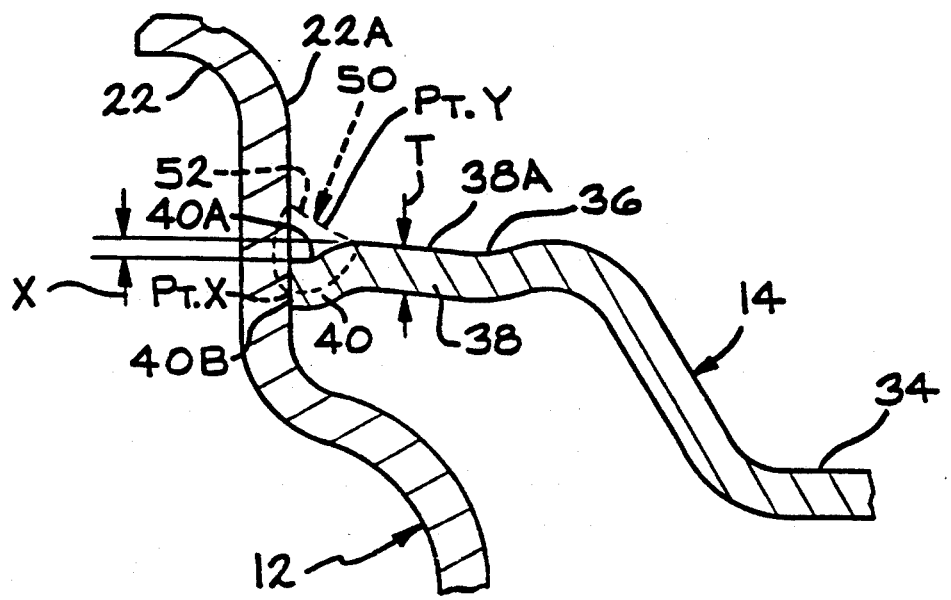
FIG. 2 is an enlarged view of a selected portion of FIG. 1, and showing a weld joint geometry for joining the disc to the rim to produce the full face fabricated wheel.

As best shown in FIG. 2, the outboard tire bead seat 36 of the rim 14 includes a first section 38 and a second section 40. The first section 38 defines a first generally axially extending outer surface, indicated generally at 38A, and a first section thickness T. Typically, in a 16×7 inch wheel, the thickness T of the first section 38 is in the range of 0.125 inches to 0.150 inches for steel, and in the range of 0.195 inches to 0.250 inches for aluminum.

The second section 40 defines a second generally axially extending outer surface, indicated generally at 40A, and an axial endmost surface 40B. The second axial outer surface 40A is spaced radially inwardly relative to the first axial outer surface 38A by a distance X, which is in the range of one-quarter to three-quarters the thickness T of the first section 38, with a radially inwardly distance X of approximately one-half T being preferred.

To assemble the wheel 10, the radial endmost surface 40B of the second section 40 of the rim 14 is positioned against an inner surface 22A of the outboard tire bead seat retaining flange 22 of the disc 12 thereby forming a recess, indicated generally at 50, between the second axial outer surface 40A of the rim 14 and the outboard bead seat retaining flange 22 of the disc 12. The recess 50 defines an axially extending annular groove, therein which receives a circumferential weld 52 for joining the rim 14 and disc 12 together to produce the full face fabricated wheel 10.

Figure 3:
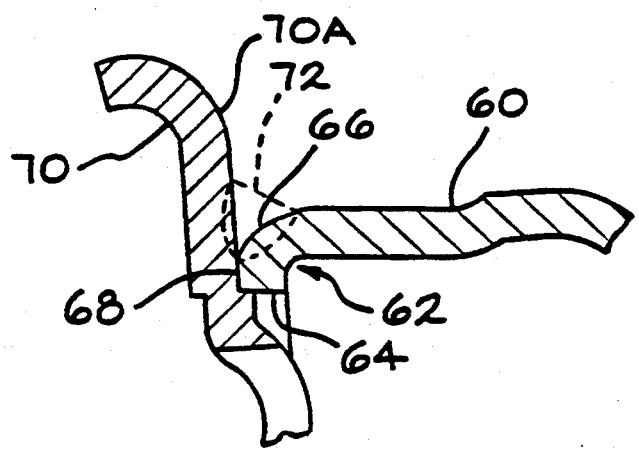
FIG. 3 is a view similar to FIG. 2, and showing a weld joint geometry for use in producing a prior art full face fabricated wheel.

One advantage of the present invention is the construction of the rim 14 better controls the lateral runout thereof. In particular, because the second section 40 of the outboard tire bead seat 36 of the rim 14 is formed having an axial endmost surface 40B, any tendency for the second section 40 to "spring back" after being formed is reduced. As a result of this, the axial endmost surface 40B of the rim 14 is maintained generally planar to the inner surface 22A of the disc 12 when positioned thereagainst. In prior art FIG. 3, because the outboard end of the rim is formed having an inturned flange 62, any tendency for the rim to spring back results in the surface 68 becoming non-planar relative to the inner surface 70A of the disc when positioned thereagainst. This especially important in rims having an increased thickness T in their outboard tire bead seat portion, because the tendency for the rim to spring back increases as the thickness T in this region increases.

Another advantage of the present invention is that the shape of the recess 50 formed by the offset in the outboard tire bead seat 36 of the rim 14 significantly thickens the "throat" of the weld 52 compared to the prior art. The throat of the weld 52 is the distance measured from the deepest part of the weld, denoted at Point X in FIG. 2, to the finished face of the weld, denoted at Point Y in FIG. 2. As a result of this, the strength of the weld joint is increased.

A further advantage of the present invention is that the wheel 10 has increased styling options over the prior art. This is because the second section 40 of the outboard tire bead seat 36 of the rim 14 of the present invention is offset relative to the first section 38 and is not turned radially inwardly as shown at flange 62 in prior art FIG. 3. As a result of this, the "fit up area" of the wheel 10 is moved further out from the center thereof compared to the prior art. The fit up area is defined as the area where the rim is positioned against the disc. Accordingly, this allows the disc to be formed with windows or openings which extend further outwardly from the center of the wheel compared to the prior art.

Yet a further advantage of the present invention is that for a similar sized wheel, a smaller blank size can be used to produce the rim 14 compared to the blank size needed to produce the prior art rim. This is because the second section 40 of the outboard tire bead seat 36 of the rim 14 is offset relative to the first section 38, and is not turned radially inwardly as shown at flange 62 in prior art FIG. 3. As a result of the smaller blank size, the cost of the material for producing the rim of the present invention is less than the cost of like material for producing the prior art rim. Also, since the size of the blank is smaller, the weight of the rim 14 of the present invention is less than the weight of a similar sized prior art rim.

While this invention has been described and illustrated as forming the offset in the outboard tire bead seat 36 of the rim 14 with the specific shape as shown, the shape of the offset can be modified so long as an axially extending groove 50 is formed between the outboard bead seat retaining flange 22 of the disc 12 and the second axial outer surface 40A of the rim 14 when the axial endmost surface 40B of the rim 14 is positioned against the disc 12.

In accordance with the provisions of the patent statutes, the principle and mode of operation of this invention have been described and illustrated in its preferred embodiment. However, it must be understood that the invention may be practiced otherwise than as specifically explained and illustrated without departing from the spirit or scope of the attached claims.

What is claimed is:

1. A full face fabricated vehicle wheel comprising:

a generally annular disc including a body having a centrally located wheel mounting surface and an outer annular portion, said outer annular portion defining an outboard tire bead seat retaining flange of the full face fabricated wheel;

a generally circular rim defining an axis and including an inboard tire bead seat retaining flange, an inboard tire bead seat, an axially extending well, and an axially extending outboard tire bead seat; and said outboard tire bead seat including a first section defining a first axial outer surface, a second section defining second axial parallel outer and inner surfaces, and a generally radially extending transition section connecting said first section and said second section with said second axial outer surface spaced radially inwardly relative to said first axial outer surface, said second section terminating at an axial endmost surface;

wherein, when said axial endmost surface of said second section is positioned against a radially extending inner surface of said outboard tire bead seat retaining flange of said disc, a recess is formed between said second axial outer surface and said outboard tire bead seat retaining flange, said recess defining an axially extending groove for receiving a weld to join said rim and said disc together and produce the finish full face fabricated wheel.

2. The wheel defined in claim 1 wherein said first section of said outboard tire bead seat of said rim includes a predetermined thickness, and said second axial outer surface of said second section is spaced radially inwardly relative to said first axial outer surface a distance in the range of one-quarter to three-quarters said predetermined thickness of said first section.

3. A rim for use in producing a full face fabricated wheel comprising:

a generally circular rim defining an axis and including an inboard tire bead seat retaining flange, an inboard tire bead seat, an axially extending well, and an axially extending outboard tire bead seat; and said outboard tire bead seat includes a first section defining a first axial outer surface, a second section defining second axial parallel outer and inner surfaces, and a generally radially extending transition section connecting said first section and said second section with said second axial outer surface spaced radially inwardly relative to said first axial outer surface, said second section terminating at an axial endmost surface.

* * * * *